United States Patent Office 3,164,996
Patented Jan. 12, 1965

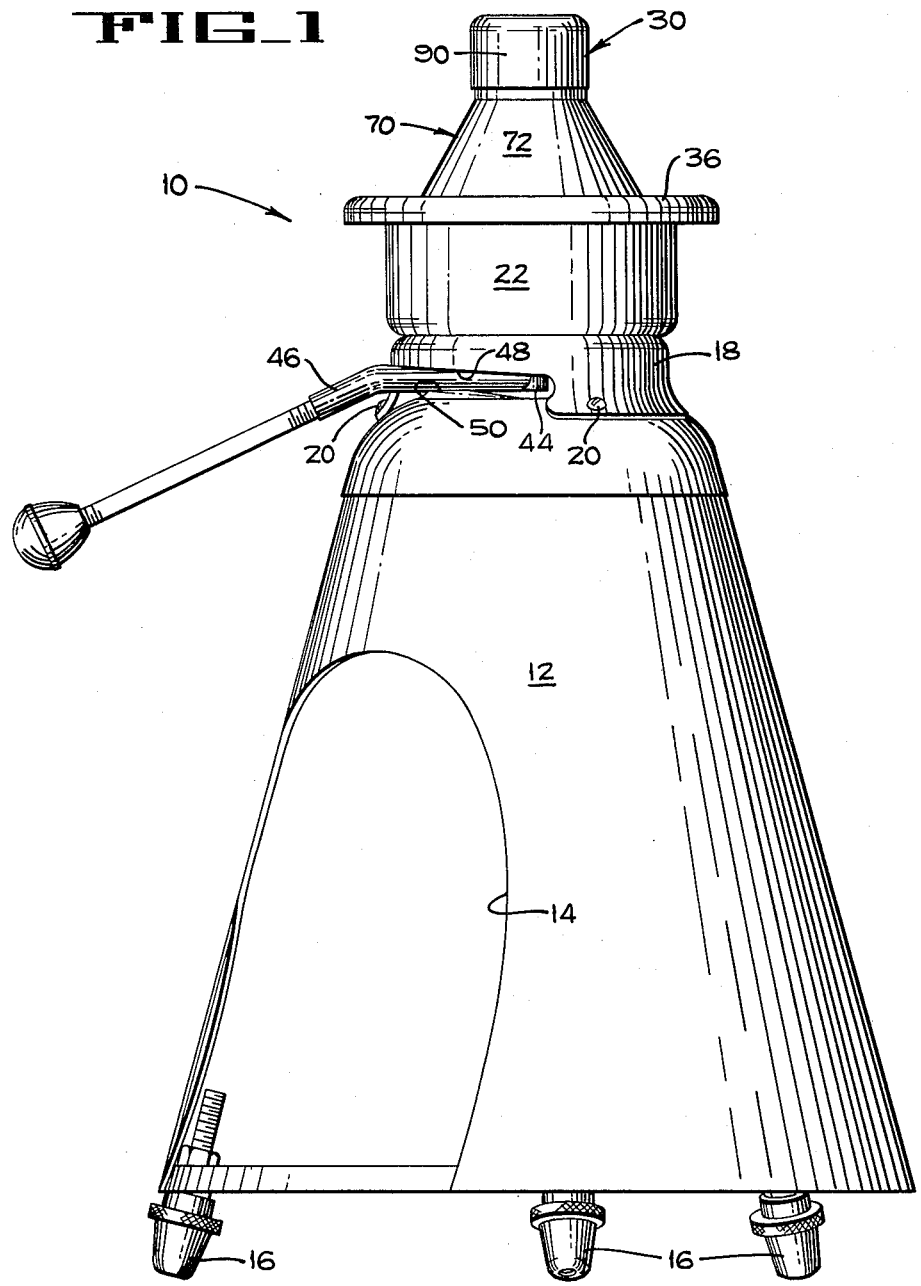

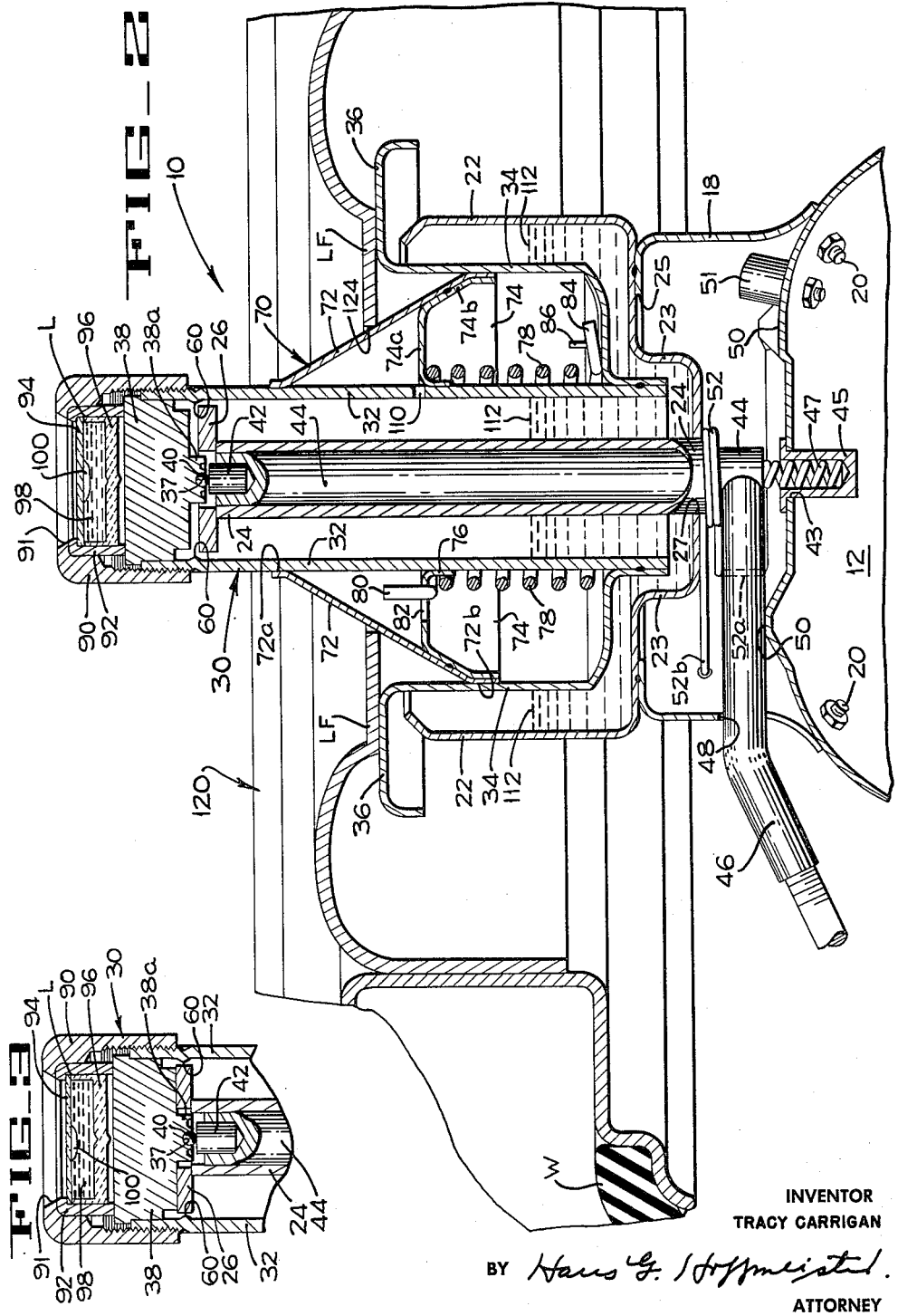

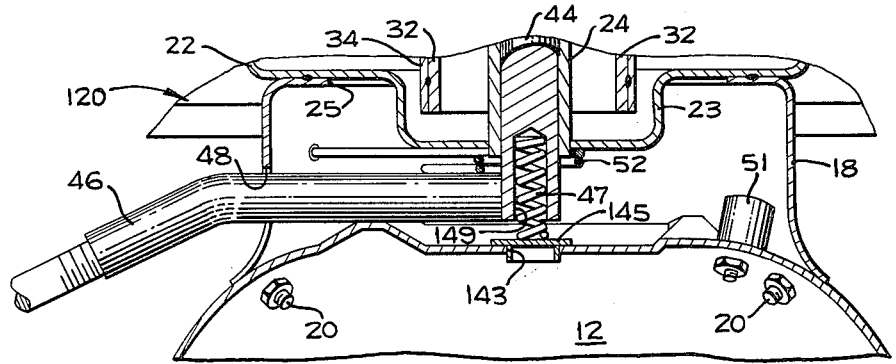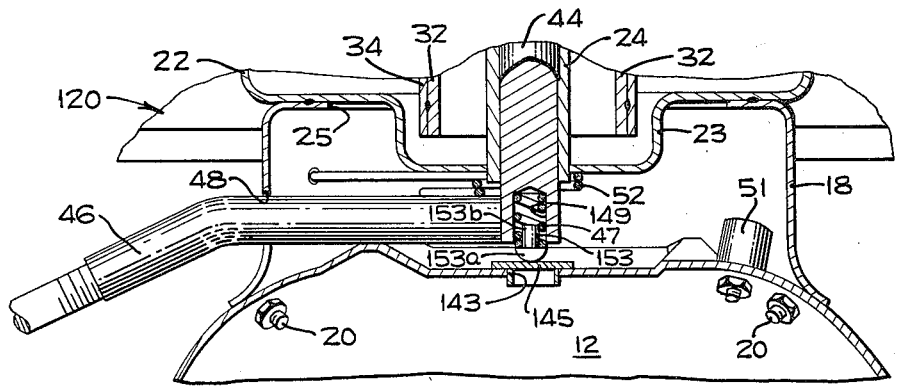

3,164,996
WHEEL BALANCER
Tracy Carrigan, Lansing, Mich., assignor to FMC Corporation, San Jose, Calif., a corporation of Delaware
Filed Jan. 15, 1963, Ser. No. 251,547
12 Claims. (Cl. 73—483)

The present invention pertains to wheel balancers, and more particularly relates to a static wheel balancer for use in balancing automobile wheels.

An object of the invention is to provide a new and improved static wheel balancer which maintains a high degree of sensitivity over a long period of time.

Another object of this invention is to provide a new and improved static wheel balancer wherein associated members forming a pivot are maintained in operative engagement so that shock loads imparted to such members are ineffective to damage the pivot.

Still another object of this invention is to provide a new and improved static-wheel balancer having a pivotally supported balancing element wherein the pivot is maintained in constant engagement by a resilient biasing element.

A further object of this invention is to provide a new and improved pivotally supported static wheel balancer wherein the pivot is resiliently maintained in engagement at all times.

Another object of this invention is to provide a new and improved pivotally supported static wheel balancer having a balancing member in constant engagement with the pivot.

Another object of the invention is to provide a new and improved pivotally supported static wheel balancer wherein means are provided to slidably constrain the balancing element substantially along a predetermined axis and to simultaneously resiliently maintain associated pivot means in constant engagement.

These and other objects and advantages of the invention will become more apparent from the following detailed description taken in conjunction with the accompanying drawings wherein:

FIGURE 1 is an elevation illustrating a static wheel balancer constructed in accordance with the principles of the present invention.

FIGURE 2 is an enlarged longitudinal section of the upper portion of the static wheel balancer illustrated in FIGURE 1.

FIGURE 3 is an enlarged fragmentary section of the pivot structure of FIGURE 2 showing the pivot structure in its inoperative position.

FIGURE 4 is a fragmentary section of the lower portion of FIGURE 2 showing a modified form of the resilient element.

FIGURE 5 is another fragmentary section of the lower portion of FIGURE 2 showing another modified form of the resilient element.

The embodiment of the wheel balancer illustrated in FIG. 1 is indicated generally by the reference character 10 and includes a base 12 which may be a hollow truncated cone-shaped housing in which tools, supplies, and the like may be stored, said housing being provided with an opening 14 through which the items may be inserted into the housing. The base member is primarily useful for supporting the tilting components of the wheel balancer at a convenient working height. The base member rests upon three leveling screws 16 which may be rotated to balance the machine.

A collar 18 rests on the upper dome-like end of the base 12 and is fixed thereto by bolts 20. As shown in FIG. 2 an oil cup or reservoir 22 is secured to the upper end of the collar 18 and has a recessed sump portion 23 projecting downwardly through an opening 25 in the upper surface of the support collar 18. A sleeve 24 is fixed within a central opening 27 in the sump of the oil cup 22 and extends vertically upward therethrough. A washer or support collar 26 is welded to the upper end of the sleeve 24.

A balancing head 30 is mounted at the upper end of the machine and comprises a central tubular member 32 having a cup-shaped member 34 fixed to its lower end. The cup-shaped member 34 is provided with an upper, outwardly projecting horizontal flange 36 upon which the lug-flange LF of the wheel W to be balanced rests during the balancing operation.

A cylindrical plug 38 is secured within the upper end of the tubular member 32 and has a ball 40 suitably secured in a spherical recess 37 on the underside of a reduced diameter portion 38a of the plug so that a portion of the ball 40 extends outwardly therefrom as shown. As will be hereinafter more particularly described, the ball 40 is maintained in constant engagement with the flat upper surface of a hardened support member 42 mounted on the upper end of a rod or standard 44 which is rotatably and slidably received within the sleeve 24.

The rod 44 extends through the lower open end of sleeve 24 and has a generally radially extending handle 46 fixed to its lower end. The handle 46 projects outwardly through a suitable opening 48 provided in the collar 18. A portion of the outer surface of handle 46 slidably engages a cam surface 50 (FIG. 2) formed on the upper end of the base 12 for moving the rod 44 axially and upwardly in the sleeve 24 thereby effecting separation between the upper annular surface of support washer 26 and the adjacent surface of plug 38. A torsion spring 52 surrounds the lower end of the rod 44, one end 52a thereof being hooked to the handle 46 and the other end 52b being fixed to the collar 18. The torsion spring 52 normally maintains the handle 46 in position against a rubber bumper 51. In this position, the handle engages the lowermost portion of the cam 50 and the rod 44 is lowered to cause the plug 38 of the balancing head to rest on washer 26. The upper generally planar, portion of base 12 includes an opening 43 in axial alignment with the longitudinal axis of rod 44. A cup-shaped retainer 45 is disposed in the opening 43 and is suitably secured to the base 12 to extend downwardly in axial alignment with the opening 43 for retaining and supporting a resilient member 47 which is preferably a coil spring. The opposite longitudinal ends of the spring 47 are located in abutting engagement with the base of the cup 45 and with the lower end of the rod 44, respectively, thereby resiliently biasing the rod 44 upwardly. The characteristics of the spring are such that constant engagement between the ball 40 and the hardened support member 42 is maintained irrespective of whether or not the handle 46 is on the lowermost or the uppermost portion of the cam 50.

By providing the spring 47, which acts to maintain abutting engagement between the ball 40 and the hardened support member 42, theoretical point contact is maintained over a longer period of time than has been possible in prior devices wherein point contact is established and disestablished, for balancing, and for loading and unloading wheels, respectively, since such repeated engagement and disengagement at the pivot results in relatively rapid deterioration of the pivot due to the shock forces derived when relative movement between the ball and its support is effected during such establishment and disestablishment. In addition, it is to be appreciated that, in prior devices, failure of the torsion spring 52 and/or failure of the operator to return the handle 46 against the bumper 51 would result, during the loading and unloading of wheels, in destruction of the pivot since contact between the ball 40 and the support 42 exists and since the forces resulting therefrom would necessarily have to be absorbed by the ball 40 and the support 42.

The construction of this invention, on the contrary, precludes failure derived from the above described conditions because the spring 47 receives the shock loads transmitted by the rod 44 and in turn imparts the greater portion thereof to the base 12 through the cup 45 secured thereto, and the remaining lesser portion is absorbed by the spring 47.

The tubular element 32 of the balancer head 30 is provided adjacent its upper end with four indentations 60, two only being shown in FIG. 2, that are spaced 90° from each other about the periphery of the tubular element 32, and are located at an elevation higher than the upper surface of the washer 26 when the rod 44 is in its uppermost position as seen in FIG. 2. The indentations 60 provide four surfaces spaced inwardly of the tube 32 which have lower inwardly inclined surfaces adapted to engage the outer periphery of the washer 26, when the head 30 is being lowered, to maintain the ball 40 in a predetermined lateral position relative to the hardened support member 42. It will be noted that, when the handle 46 is located on the lowermost portion of the cam 50, the cylindrical plug 38 rests on the upper surface of the washer 26, and any static load on the head will be transmitted directly to the base through the washer 26 and the tube 24. At the instant that the wheel is placed on the flange 36 the resultant shock load is transmitted to the rod 44 through the ball 40 and the support 42 which shock load is absorbed by the spring 47 and the base 12.

FIG. 3 shows the relation of the ball 40 and the support 42 when the balancing apparatus is conditioned for receiving a wheel to be balanced. When the handle 46 is on the lowermost position of the cam 50, the plug 38 comes in contact with the washer 26 thus rendering the balancing head 30 inoperative by precluding pivotal rocking movement thereof. It will be noted however, that the ball 40 and the support 42 remain in contact, as hereinabove particularly described, regardless of whether the balancing head 30 is resting on the washer or is supported solely by the rod 44.

A wheel centering cone assembly 70 is slidably mounted on the tubular member 32 of the balancing head 30. The cone assembly comprises a truncated cone-shaped member 72 having an inner cylindrical guide surface 72a at its upper end slidably engaging the outer surface of the tubular member 32, and an outer cylindrical guide surface 72b at its lower end slidably received within the cup member 34. A member 74 is provided with a horizontal disc portion 74a and a frusto-conical portion 74b that is rigidly secured to the lower end of the member 72. The inner edge of the disc portion 74a is formed to provide a downwardly extending annular flange 76 which slidably embraces the tubular member 32. A spring 78 surrounds the tubular member 32 with one of its ends 80 bent upwardly and projecting through a slot 82 in the disc portion 74a. The other end 84 of the spring abuts the bottom of the cup element 34 and is confined against movement by a bracket 86 fixed to the cup member. The spring 78 normally urges the cone assembly 70 to its uppermost position.

The cone assembly 70 is confined on the tubular member 32 by a cap 90 which has a central opening 91 and is threaded onto the upper end of the tubular member 32. As best shown in FIGS. 2 and 3, the cap 90 has incorporated therein a spirit level L comprising an outer cylindrical metal ring 92, an upper glass sheet 94 which is slightly concave having its high point at the central portion thereof, and a ceramic plug 96 which is secured to and closes the lower end of the metal ring 92. A quantity of liquid 98 is confined between the glass plate 94 and the ceramic plug 96. The liquid 98 does not quite fill the area so confined so that a bubble 100 remains therein. As is conventional, the resulting bubble 100 and associated indicies, not shown, are brought into a predetermined relation when the wheel is balanced. When the cap 90 is threaded onto the member 32, the lower end of the metal ring 92 of the spirit level abuts the ground upper face of the plug 38 fixed therewithin.

In the use of the device, the balancing head is first assembled by placing the spring 78 in place, then the cone assembly 70 is slipped over the upper end of the tubular member 32, and the cap 90 is screwed onto the upper end of the member 32. Oil is then placed in the cup 22 fixed to the upper end of the stand 12, and the balancing head 30 is inserted over the upper end of the sleeve 24 with the lower end of the head projecting into the oil previously placed into the cup 22. A bleed hole 110 is provided in the tubular member 32 to permit the escape of air from therewithin as the oil 112 enters the lower end of the tubular member 32.

The oil helps to dampen out oscillations of the balancing head 30. As the balancing head 30 is moved downwardly over the sleeve 24, the inner surfaces of the projections 60, or at least some of them, will contact the outer peripheral surface of the washer 26 to center the balancing head with respect to the sleeve 24. At this point the head is resting solidly on the washer 26 and the ball 40 is in contact with the hardened seat 42. The wheel and tire assembly 120 is now placed on the balancer so that the inner periphery 124 of the lug flange LF contacts the cone assembly 70 and is centered thereby, the weight of the wheel assembly being effective to depress the cone 70 against the action of the spring 78 until the lug flange LF rests on the flange 36.

The handle 46 is now swung around the axis of the balancer by the operator against the resistance of the spring 52 so that the handle moves up the inclined cam surface 50 causing the rod 44 to be raised and the lower abutting surface of the plug 38 to be moved axially away from the washer 26, and thus condition the apparatus for balancing the assembly 120. Any imbalance of the wheel assembly 120 will be indicated by the movement of the bubble 100 in the spirit level away from its centered position. After the operator has noted the direction and amount of the movement of the bubble, he releases the handle 46, permitting the balancing head to come down and rest on the upper surface of the washer 26 while he applies suitable weights to the light portion of the wheel assembly 120. The operator then again operates the handle 46 to get a new reading on the spirit level and repeats the process until the bubble 100 in the spirit level remains centered when the ball 40 is resting on the support surface 42.

FIG. 4 shows one modification incorporating the principles of this invention. In an opening 143 a cap 145, having an enlarged head portion, is disposed as shown. The cap 145 closes the opening 143 and provides a supporting surface for the spring 47. A suitable blind bore 149 is formed in the lower end of the rod 44 with the axis thereof being coincident with the longitudinal axis of the rod 44. The spring 47 in this modification is located in the bore 149 and is of a preselected length so that the opposite ends thereof are in constant engagement with the base of the bore and with the upper planar surface of cap 145 as shown. As in the preferred form of this invention, the instant modification, by means of the spring 47, maintains contact between the ball 40 and the support 42 regardless of the position of the handle 46 relative to the cam 50.

FIG. 5 shows a second modification, which this invention may assume and includes the cap 145, the bore 149, and the spring 47 but, in addition thereto, a spring guide member 153 is provided having a hemispherical head portion 153a and a cylindrical shank 153b. The shank portion 153b is slidably disposed in the spring 47 and the head portion 153a is maintained in engagement with the upper planar surface of cap 145 by the spring 47. This modification operates in substantially the same manner as the above described modification with the exception that the shank 153b acts as a guide for the spring 47 wherein the possibility of lateral spring deflection is precluded and, since the head 153a is in engagement with the cap 145, as described, relative pivotal movement therebetween is facilitated.

While a preferred embodiment of the present invention has been described herein, it should be noted that various changes may be made therein without departing from the spirit of the invention as defined in the appended claims.

The invention having thus been described what is believed to be new and desired to be protected by Letters Patent is:

1. In a wheel balancer, a wheel supporting member formed to support a wheel on an axis coincident with the center of such wheel, a standard pivotally engageable with said supporting member and arranged to pivotally engage said supporting member on such an axis, means for moving said standard and said supporting member at the same time in either of two alternate opposite directions along such axis, a base member for supporting said wheel supporting member when said standard moves in one of said directions, and means on said base member for maintaining constant pivotal engagement between said standard and said wheel supporting member.

2. In a wheel balancer, a wheel supporting member for supporting a wheel on a vertical axis coincident with the center of such wheel, an elongated standard having the longitudinal axis thereof coincident with such axis for pivotally engaging said supporting member on such axis, means for moving said standard and said supporting member at the same time in either of two alternate opposite directions along such axis, a base member for supporting said wheel supporting member when said standard moves in one of said directions, and resilient means between said base member and said standard for maintaining pivotal engagement between said standard and said wheel supporting member at all times.

3. In a wheel balancer, a wheel supporting member for supporting and orienting a reference portion of a wheel to be balanced in a predetermined plane, a standard pivotally engageable with said supporting member on an axis normal to such predetermined plane, means for moving said standard and said supporting member at the same time in either of two alternate opposite directions between selected limits along such axis, a base member for supportably maintaining said supporting member in a fixed plane and for defining a first of such limits when said standard moves in one of said directions, and means on said base member for maintaining pivotal engagement between said standard and said supporting member at the first of such limits.

4. An apparatus for statically balancing wheels comprising, a support, a tubular member secured to said support, a rod slidably disposed in said tubular member, selectively operable means for moving said rod in one of two alternate directions along its axis relative to said tubular member, a balancing head, means for pivotally mounting said balancing head on said rod when said rod is moved in one of said directions, means on said support and on said head for supporting said head in a fixed plane when said rod is moved in the other of said directions, and resilient means on said support for maintaining said head and said rod in constant engagement irrespective of the direction of movement of said rod.

5. An apparatus for statically balancing wheels comprising, a support, an upwardly extending tubular member secured to said support, a rod slidably disposed in said tubular member, selectively operable means for moving said rod in one of two alternate directions along its axis relative to said tubular member, a balancing head, means for rockably mounting said balancing head on the upper end of said rod, means on said balancing head and on said tubular member cooperable to interrupt rocking movements of said balancing head and to supportably maintain said head in a fixed plane when said rod is moved in one of said directions, and spring means in engagement with the lower end of said rod and said support to urge said rod upwardly for effecting constant engagement between said balancing head and such upper end of said rod.

6. An apparatus for statically balancing wheels comprising, a base member, a wheel support member disposed on said base member and including a balancing head, a vertically extending tubular member secured to said base member for supportably maintaining said support member in a fixed plane, a rod slidably disposed in said tubular member, means for pivotally mounting said balancing head on the upper end of said rod, selectively operable means for moving said rod and said wheel support member between an upper limit and a lower limit relative to said tubular member and to said base member whereby at said lower limit said wheel support member is surrendered to the control of said tubular member and at said upper limit said wheel support member is lifted clear of said tubular member by said rod, and resilient means on said base member for maintaining said pivotally mounting means in constant engagement irrespective of the direction of movement of said rod.

7. In a wheel balancer, a wheel supporting member for supporting and orienting a reference portion of a wheel to be balanced in a horizontal plane, an upwardly extending pedestal having the upper end thereof pivotally engageable with said supporting member, means for moving said pedestal and said supporting member in vertically opposite directions between selected limits, a base member for supporting said wheel supporting member and adapted to prevent pivotal movement between said supporting member and said pedestal when said pedestal is moved vertically downwardly to the first of such limits, and resilient means located between said base member and the lower end of said pedestal for urging said pedestal toward the second of such limits to maintain pivotal engagement between said supporting member and said pedestal at least at the first of such limits.

8. In a wheel balancer, a base member, a wheel supporting member on said base member for supporting and orienting a reference portion of a wheel to be balanced in a horizontal plane, an upwardly extending pedestal having the upper end thereof pivotally engageable with said supporting member, means for moving said pedestal and said supporting member upwardly and downwardly relative to said base member between selected limits, means on said base member for supportingly maintaining said supporting member in a fixed plane when said pedestal is moved downwardly to one of such limits, resilient means on said base member for maintaining pivotal engagement between said pedestal and said supporting member at said one of such limits, and means for retaining said resilient means in a predetermined orientation so that an upwardly directed bias is imparted to said pedestal at all times.

9. The combination of claim 8 wherein said retaining means comprises a cup-shaped member for receiving said resilient means in such a predetermined orientation.

10. The combination of claim 8 wherein said retaining means comprises a bore formed in the lower end of said pedestal for receiving said resilient means in such a predetermined orientation.

11. The combination of claim 8 wherein said retaining means comprises a bore formed in the lower end of said pedestal for receiving said resilient means in such a predetermined orientation and a cylindrical member having a radially enlarged hemispherical terminal portion with the cylindrical portion of said cylindrical member being located within said resilient means.

12. In a wheel balancer a wheel supportng member formed to support a wheel on an axis coincident with the center of such wheel, a standard pivotally engageable with said supporting member for supporting the combined weight of said wheel and said supporting member on said axis, means for moving said standard and said supporting member at the same time in either of two alternate opposite directions along such axis, a base member to relieve said standard of the weight of said wheel and said wheel supporting member when said moving means moves in one of said alternate directions, and means on said base member for maintaining constant pivotal engagement between said standard and said wheel supporting member when the combined weight of said wheel and said supporting member is transferred from said standard to said base member by said moving means.

References Cited in the file of this patent
UNITED STATES PATENTS

| | | |
|---|---|---|
| 1,701,464 | Kraft | Feb. 5, 1929 |
| 2,298,656 | Smith | Oct. 13, 1942 |
| 2,909,063 | Bageman | Oct. 20, 1959 |
| 3,055,221 | Bageman et al. | Sept. 25, 1962 |